June 2, 1942.  G. C. TROTTER  2,284,698
SCREW AND WASHER ASSEMBLING MACHINE AND METHOD
Filed April 24, 1939  6 Sheets-Sheet 6

INVENTOR.
George C. Trotter
BY Cox & Moore
ATTORNEYS

Patented June 2, 1942

2,284,698

UNITED STATES PATENT OFFICE 2,284,698

SCREW AND WASHER ASSEMBLING MACHINE AND METHOD

George C. Trotter, Chicago, Ill., assignor to Illinois Tool Works, Chicago, Ill., a corporation of Illinois Application April 24, 1939, Serial No. 269,820

30 Claims. (Cl. 29—84)

The present invention relates to the assembly of related elements, and more particularly to a method and machine for assembling fasteners and washers.

The present invention contemplates the assembly of screw and washer elements by passing the washers and the screw blanks along respective linear paths of movement into position where the paths intersect, at which position the fasteners are directed into alinement and interengagement with the washers.

It is an object of the present invention to simplify the assembly of the foregoing elements by eliminating the necessity for especially conveying either of the elements out of its path of feed, thus eliminating handling steps and simplifying and reducing the cost of the mechanism by providing for the interassembly of the elements directly from the respective paths of feed.

In accordance with the present invention, moreover, the screws or fasteners, and likewise the washers, are convenienaly massed or supplied in bulk to respective feeding points or hoppers, and it is an important feature of the present invention that the elements are picked up by conveying means at their respective feeding points and carried by the conveyors directly into the predetermined paths of feed. It is, accordingly, an important object of the present invention to provide conveying means operating adjacent the screw and washer hoppers and adapted to receive the elements from the respective hoppers while engaging the elements in predetermined supporting position, and in such position initiating feeding in predetermined paths of movement out of the hoppers and to the point of assembly.

It is a further object of the present invention to provide washer conveyors of the endless type and having recesses or seats formed in the endless conveyor for accommodating individual washers and for receiving these washers one by one in the line of feed, and preferably so that the planes of the washers are all coincident with the plane of the conveyor. The present invention similarly comprehends the provision of an equivalent conveyor and feed device for the screws or screw blanks.

Yet a further object of the present invention contemplates the provision of an independent assembly means adjacent the intersection of the predetermined paths of feed of the screws and the washers, in accordance with the foregoing, for positively controlling and coordinating the feed of the screw blanks into engagement with the respective washers, at the same time controlling the association of the elements by tilting each fastener so that its extremity swings into the central aperture of the washer as the latter element moves forwardly in its path of feed.

It is an additional object of the present invention to operate the foregoing conveyor means in such fashion that they reciprocate or periodically move reversely in their path of feed in order to rearrange the massed elements in the hoppers to assure reception of the elements in successive order by the conveying member.

It is further contemplated, in accordance with the present invention, that control of the respective feeding means and assembly means be effected in order to provide for a coordinated supply of elements with respect to each other, as well as a coordinated supply of assemblies to the thread forming machine in connection with which the present invention is illustrative.

The present invention contemplates more particularly the cessation of the screw blank feed when a limited predetermined quantity of screw blanks has been supplied in position for assembly, and, conversely, the cessation of washer feed when, for some reason, the supply of screw blanks has terminated. The absence of a supply of washers in the washer conveyor similarly inactivates the assembly means, and all of the respective feeding means are cut off when a predetermined maximum supply of assemblies has reached the thread rolling machine, awaiting treatment thereby.

Numerous other objects and advantages of the present invention will be apparent throughout the course and progress of the following specification, wherein:

Figure 3 is a view taken on the line 3—3 in Figure 9;

Figure 20 is a detail sectional view taken on the line 20—20 in Figure 10;

There is shown in the figures of the present drawings one form of illustrative machine embodying the features of the present invention, which machine comprises a screw thread rolling machine of standard type, such as shown in Wilcox Patents No. 1,584,263, of May 11, 1926, and No. 1,798,919, of March 31, 1931. In so far as the essential portions of the thread rolling machine are concerned, namely, the frame and supporting portions, the thread rolling dies, the transfer and starting mechanism, as well as the driving mechanisms for the same, these are substantially unmodified. Accordingly, it is unnecessary, in accordance with the present invention, to reiterate in detail the known construction thereof.

In accordance with the present invention, the machine which forms the illustrative embodiment of the present invention comprises a thread rolling machine of the foregoing character provided with a plurality of additional and substitute mechanisms by which the said machine may be adapted for the production of a permanently assembled screw and washer unit as a new article of commerce. These additional and substitute mechanisms comprise in general a screw blank supply and feeding mechanism 26, a washer supply and feeding mechanism 28, an assembly mechanism for directing each screw blank into association with a washer 30, and a control system related to all of the foregoing mechanisms and for coordinating the operation thereof.

The screw thread rolling machine comprises a main base or pedestal 32 surmounted by an auxiliary base or body 34 secured to or formed integrally with the part 32 and extending upwardly at an angle of approximately thirty degrees to the horizontal. The body 34 supports a pair of thread rolling dies 36 and 38, the former being fixed with respect to the frame and the latter being relatively movable upon a gate or slide. Operation of the slide is effected from a drive motor 40 through the agency of a drive belt 42, gearing 44, and crank and pitman 46. A cam 48, also driven from gearing 44, moves a follower 50 at predetermined times to operate a slide bar starting mechanism which directs and assists the blanks into engagement with the dies. The slide bar, which is designated by the reference numeral 52, is slidably supported on the frame of the machine in a direction parallel to its long dimension and also in alinement with the space between the dies 36 and 38. The slide bar 52 carries at its forward end a forwardly projecting starter finger 54 alined centrally of the aforesaid space between the dies. The starter slide bar is operated from the follower mechanism 50 by an arm 56 rigid with rock shaft 58, which is journalled in the upper portion of the frame, as clearly shown in Figures 1 and 2, and which is shifted from the follower mechanism by a link 60 and arm 62.

The present invention provides a guide chute construction 64 down which the screw blank and washer assemblies gravitate to the region of the thread rolling dies and starter, and a standard transfer mechanism 66, not shown in detail in the drawings, which provides means for engaging each assembly at the end of the chute 64 and shifting it laterally through a passage into proper position centrally of the space between the thread rolling dies.

In accordance with the present invention, quantities of screw blanks are massed in a hopper at the screw blank feeding mechanism and are continuously deposited one by one on a conveyor and directed in a predetermined path to the point of assembly. The washers are similarly dumped or massed in a feed hopper forming a part of the washer feed mechanism and are continuously received by a conveyor which is a part of the washer feed construction. The washers, while thus conveyed, move along a predetermined path intersecting the path of feed of the screw blanks, and at the point of intersection an assembly unit acts to contact one by one each of the screw blanks and direct its end into the central aperture in a washer which is at this time conveyed adjacent said point of intersection. The assemblies thus formed by association of the elements continue to move in said predetermined path until they are ejected from the washer conveyor and deposited upon the assembly feed chute 64, whence they gravitate to the thread rolling station. It will be understood that in the thread rolling dies the surface material forming the shank of the screw blank is caused to flow so that the crests of the thread are projected outwardly beyond the original surface of the shank, thus permanently retaining the washer and screw in associated relationship. The threaded units discharged from the machine are, therefore, permanently associated.

The assembling and conveying mechanisms are all mounted upon a frame or casting 68 comprising a vertically extending wall 70 with a lateral lower flange 72. The frame or casting 68 is mounted upon the main base or pedestal 32 through the agency of a bracket 74, Figure 1. The bracket or casting 74 is preferably adjustably mounted upon the pedestal 32 for adjustment along an inclined plane 76 at a right angle to the axis of the chute 64 in a manner to permit adjustment of the bracket and supporting frame with respect thereto.

The feed mechanism for the screw blanks

As shown in Figures 1, 3, 4, 5, 6 and 9, the screw feed mechanism comprises a hopper 78 having side walls 80 and a rear wall 82. A baffle 84 within the hopper forms one of the retaining walls for the mass of blanks in the hopper. It is to be noted that all of the four retaining walls, accordingly, are inclined so that they may cooperate to taper toward the bottom, see Figures 3 and 9. The bottom opening of the hopper is closed by an endless band 86, which moves across the opening to receive screw blanks, as clearly shown in Figures 3 and 9. The forwardly extending extremities of the hopper side walls 80 support stripper springs 85, see Figures 3 and 5, having a U-shaped configuration, as shown, and having their lower extremities so elevated above the band that they will not touch screw blanks properly positioned therein. The resilient springs 85, however, do not allow clearance of blanks otherwise improperly positioned, so that such blanks are either caused to return toward the hopper or are dislodged and permitted to fall into proper engagement with the band.

The band 86 rides in an annular track or groove 87 in a drive pulley or sprocket 88 and is additionally supported within an alined annular track in a radius block or disk 90 and passes over an idler pulley 92. The several band supporting elements are in turn mounted upon the casting or frame 68, the radius block being rigidly fastened to the frame as at 94, the idler pulley being journalled upon a suitable pivot for free rotation, while the drive pulley is rigid with a driven shaft 96 rotatably journalled in the upstanding wall 70 of the frame 68.

Attention is particularly directed to the fact that the conveyor band 86 has two series of apertures extending along its entire length. More particularly, a file or line of circular apertures 98 are spaced to receive teeth or protuberances 100 on the periphery of the drive sprocket so that the conveyor band is under positive driving control. The other series of apertures designated by the reference numeral 102 are relatively elongated for receiving the shank of the screw blanks and carrying the blanks while supported by the head portions.

Figures 3, 4, 5:
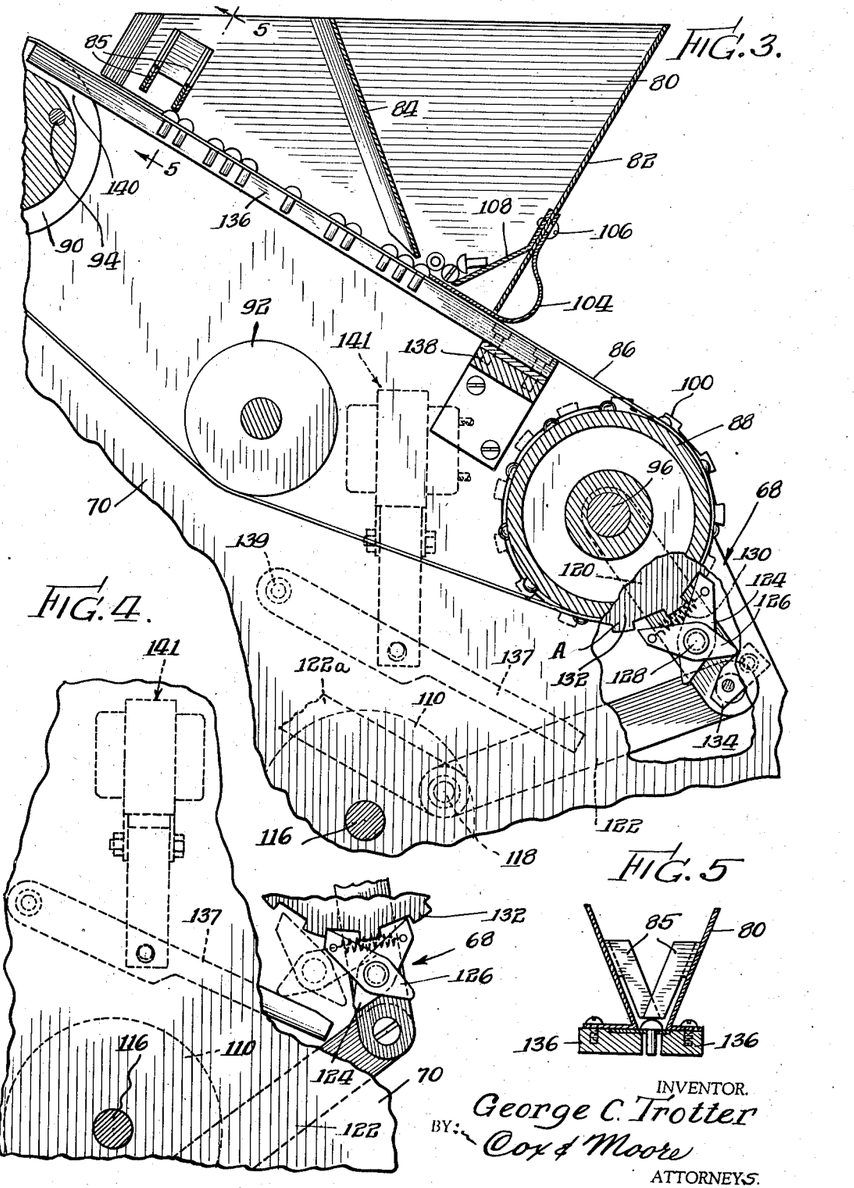
Figure 3 is a fragmentary sectional view taken centrally through the screw hopper and supply mechanism on the forward side of the supporting plate or casting, portions of the mechanism, including the supporting plate, being broken away to illustrate the operation of the conveyor advancing means.
Figure 4 is a fragmentary view substantially the same as Figure 3 but showing the parts in a different operative position in order to illustrate their function.
Figure 5 is a detail perspective view taken on the line 5—5 in Figure 3.

In accordance with the present invention, an intermittent or reversing movement is imparted to the conveyor 86. That is to say, the band is caused to progress forwardly beneath the hopper to pick up and receive in the elongated apertures 102 as many fasteners as possible. The motion is then reversed for a predetermined period, and after this period the band is again caused to move forwardly. This action imparted to the band desirably stirs or rearranges the blanks within the hopper or at least within the bottom portion of the hopper, causing them to be readjusted to cause a maximum number of the screw blanks to be received within the elongated apertures 102. It will be evident from the foregoing that upon the return or reverse movement of the band, screw blanks engaged within the apertures and impinging upon a rigid portion of the hopper might be crushed or damaged. For preventing this, a flat spring member 104, secured by fastener 106 to the rearward wall 82 of the hopper, curves outwardly and downwardly and then resides flatwise against the band, as shown in Figure 3, extending a substantial distance beyond a baffle 108 likewise supported by fastener 106. The flat spring 104 yields rearwardly under impingement by screw blanks which have fallen into the adjacent aperture to permit reverse movement of the band.

The mechanism for driving the shaft 96 and, accordingly, the entire screw blank feeding mechanism, comprises a rotating disk 110 continuously driven from an electric motor 112 through the agency of appropriate gearing, drive belt and pulleys, designated generally by the reference numeral 114, which rotate a shaft 116 journalled in the frame 68, upon which shaft the disk 110 is rigidly mounted. A crank 118 upon the disk reciprocates a lever 120 through the agency of a pitman 122. The extremity of the lever 120, as clearly shown in Figure 3, is rotatably journalled upon the shaft 96 and bear a pair of ratchet pawls 124 and 126 rotatable upon pivot 128. A spring 130 connects the pawls, causing them to bear against a ratchet wheel 132, which is rigid with the shaft 96 and thus in rigid driving relationship with the sprocket 88.

As the pitman 122 advances on its forward stroke, the leading edge of the pawl 124 engages behind a tooth of the ratchet wheel 132, revolving the wheel and advancing the band 86 forwardly. It will be evident that under ordinary circumstances, as the pitman returns on its reverse stroke, the leading edge of the other pawl 126 would tend to engage behind an adjacent tooth of the ratchet wheel to carry the ratchet in the opposite rotational direction. It is extremely important to note, however, that there is rigidly mounted upon an adjacent surface of the frame 68 a cam block 134, which is so located that it impinges the outer end of the pawl 126 when the pitman is at the forward end of its stroke, thus preventing the pawl 126 from engaging the ratchet. That is to say, the surface of the cam block functions to revolve the pawl 126 slightly to disengage the ratchet wheel. During the return movement of the pitman the pawl is retained out of engagement with the ratchet a sufficient length of time to miss engagement with the ratchet tooth A, Figure 3, although the pawl slides relative to the ratchet until it strikes the next successive tooth behind the tooth A, and from this point continues to reversely rotate the ratchet until the end of the return stroke is reached. Upon the initiation of the next forward stroke, however, the pawl 124 engages behind an adjacent tooth to move the rotatable assembly throughout a substantially full stroke of the pitman. From the foregoing it will be apparent that the effect of this driving mechanism is to periodically move the band 86 forwardly a distance, for example, equal to the spacing of substantially one and one-third of the ratchet teeth and between each movement to return the band a distance equal to substantially two thirds of the said tooth spacing. As stated above, this results in advancing a line or progression of screw blanks upwardly and forwardly in accordance with the progression of the band 86.

An effective means is provided for terminating feeding of the screw blanks and comprises a lever 137 pivoted to the supporting frame 68 as at 139 and controlled by a solenoid 141. When the lever 137 is rotated through a short counter-clockwise arc by actuation of the solenoid 141, its free extremity moves upwardly into position adjacent the outer extremity of the pawl 124 and in this position has substantially the same function with regard to the pawl 124 as the fixed cam block 134 has upon the other pawl 126. That is to say, when the solenoid is activated, the end of the lever 137 throws the pawl 124 out of engagement with the ratchet tooth at the beginning of the forward movement of the pitman so that the motion imparted to the band 86 is equal in both directions. The band 86, accordingly, when so controlled reciprocates but fails to advance or progress in the direction of feed.

In Figure 4 the full line view shows the pawls and associated mechanism returning toward the rearmost portion of the path of travel with the lever 137 in position to engage the pawl 124. The dotted line exemplification of the pawls illustrates the manner in which the pawl 124 is rotated by contact with the lever 137 to cause it to clear the adjacent tooth. It will be understood that the foregoing control mechanism is to be operated at predetermined times, as will hereinafter more fully appear, to terminate feeding of the screw blanks for coordinating the operation of the various mechanisms.

It is to be noted that the band 86 and the screw blanks are additionally supported by a pair of spaced bars 136 mounted at their rearward extremities upon a bracket 138 fastened to the frame 68 and having their other extremities secured within appropriate recesses 140 in the radius block. It will be understood that the bars 136 are spaced a sufficient distance to permit the shank of the blanks to extend freely therebetween. It is contemplated, in accordance with the present construction, that at least one or both of the bars may be mounted in such a manner as to permit lateral adjustment for accommodating the machine to fasteners of varying dimension.

Figure 9:
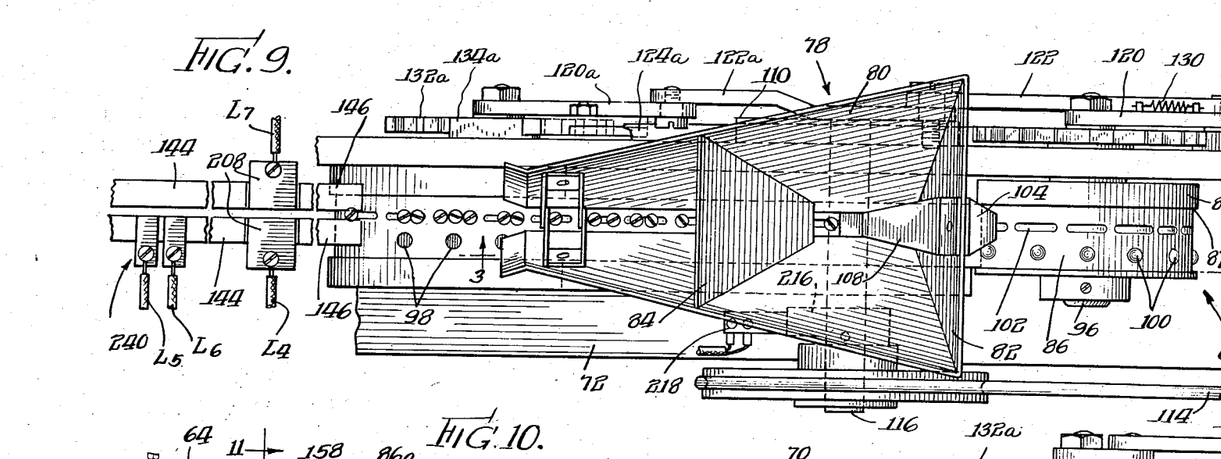
Figure 9 is a plan view of the screw blank hopper and feed assembly.

From the band 86 the blanks are supplied to a downwardly inclined chute 142 comprising a pair of spaced bars 144 rigidly secured to the supporting frame 68. A pair of thin stripper fingers 146 extending from the upper extremities of the bars 144 press against the surface of the band where it passes over the radius block 90, as shown in Figure 9. The bars 144 and stripper fingers 146 are spaced to freely accommodate and guide the blanks while engaging beneath the head portion. Attention is directed to the fact that the spring fingers impinge the band 86 at a point where the band proceeds to curve downwardly. The weight of the suspended shank portion of each blank tends to retain the blank in vertical position, wherefore the forward edge of the head of each blank at this point tends to spring upwardly and leave the band. This permits the termini of the spring fingers to engage beneath the head and to lift the blanks out of the elongated apertures 102, whence they gravitate along the chute 142 to the point of assembly.

From the foregoing it will be seen that in operation the fastener blanks are successively deposited within apertures in the conveyor band 86, which progressively feeds them in a predetermined path. At a spaced point the blanks are transferred to a chute which carries them downwardly in said path. The band 86 comprising an endless conveyor continues to move in its endless path to pick up additional blanks and supply them to the head of the feed chute.

*The feed mechanism for the washers*

As shown more clearly in Figures 1, 6, 7 and 10 to 12, inclusive, the washer feed mechanism comprises an endless band conveyor and drive and supply mechanism in all respects equivalent to that provided for handling the screw blanks. More particularly, endless belt 86a is carried by sprocket 88a rigid with shaft 96a and by idler pulley 92a and radius block 90a. The alternate movement of the band 86a is imparted, as before, from the crank 118, through pitman 122a, lever arm 120a and pawls 124a and 126a to a ratchet wheel 132a rigid with the shaft 96a. The cam block 134a, rigid with the supporting frame 68, is in position to throw the pawl 126a out of engagement with the ratchet wheel to relatively shorten the arcuate return movement of the ratchet in accordance with the previous embodiment. A solenoid 141a controls a lever 137a pivoted at 139a to the supporting frame, so that when the solenoid is activated, the free end of the lever is thrown into engagement with the outer end of the pawl to terminate progressive advance of the band 86a.

The points of distinction which characterize the instant specific washer conveying construction are as follows: the band 86a is provided with a single row or file of apertures 147 of sufficient diameter to accommodate the washers which are to be employed. It should be noted that peripheral projections or teeth 148 formed on the sprocket wheel 88a are configurated for engagement within the apertures 147, whereby one series of band apertures suffices to accommodate the washers being fed and to provide driving engagement with the drive sprocket.

Figures 1, 2:
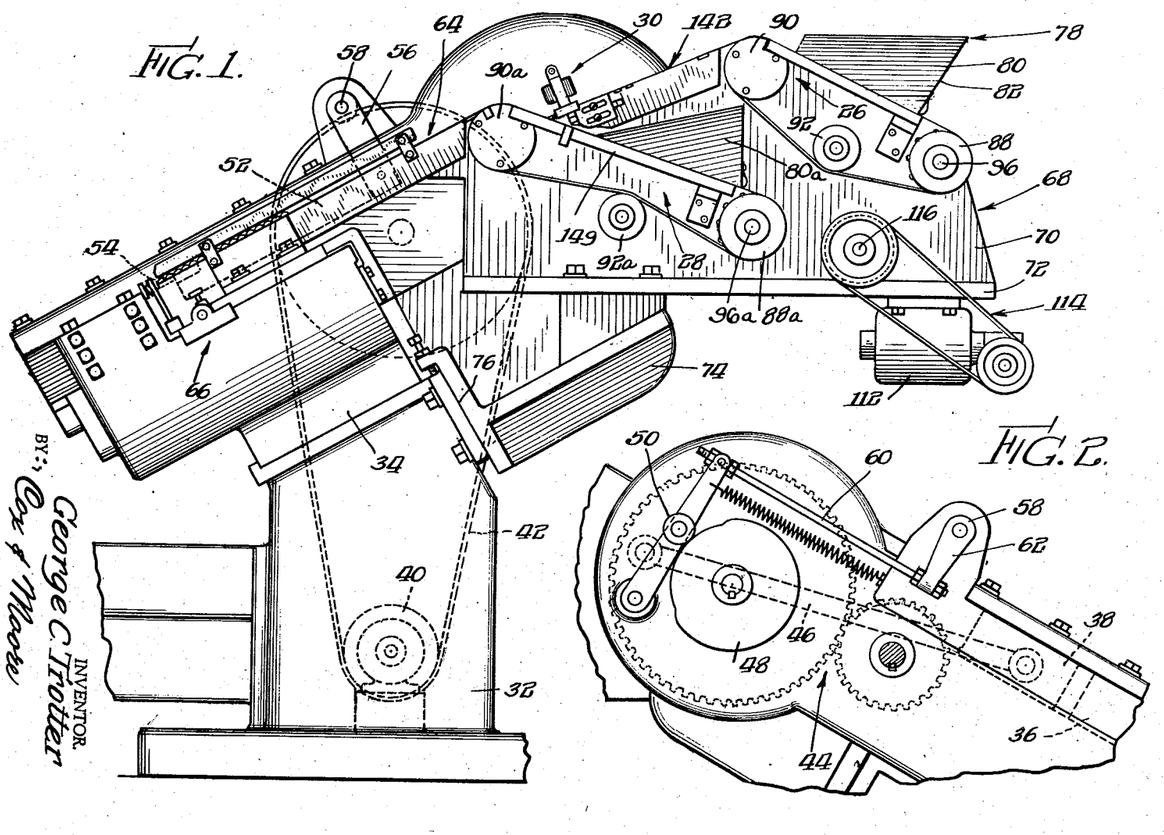
Figure 1 is an elevational view of a machine embodying the present invention.
Figure 2 is a detail elevational view showing the central upper portion of the machine of Figure 1, the view being taken from the opposite side.
Figures 6, 7, 8:
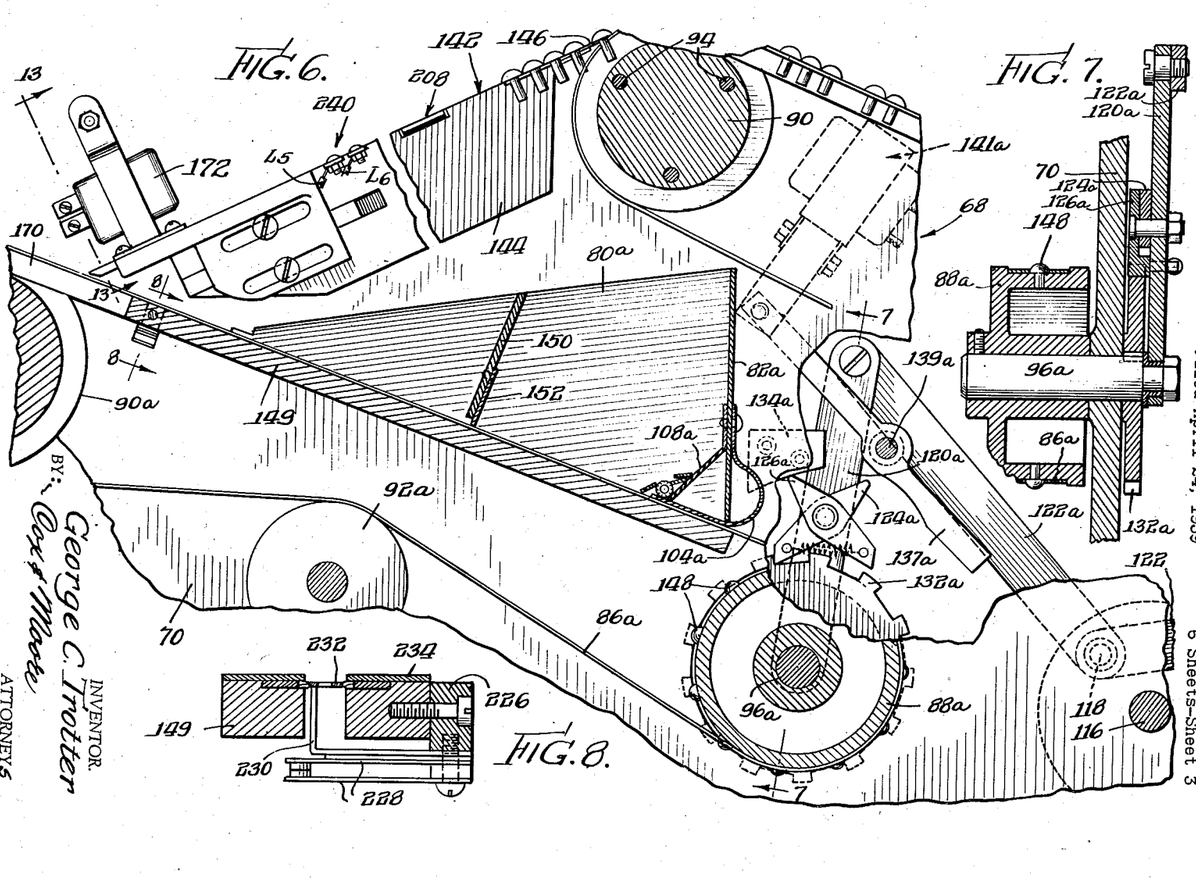
Figure 6 is a fragmentary view taken sectionally through the washer feed hopper and associated washer and screw supply means. More specifically, the sectional view is taken on the line 6—6 in Figure 10.
Figure 7 is a detail sectional view taken on the line 7—7 in Figure 6.
Figure 8 is a detail sectional view taken on the line 8—8 in Figure 6.

It will be understood from the foregoing that the washers are to be conveyed while received within the apertures 147, and to retain washers within the said apertures the upper run of band 88a, where it carries washers, passes along and rests upon a plate 149 secured to the supporting frame 68 by any suitable fastening means, not shown, Figures 1 and 6. The plate 149 is preferably recessed to receive the band while providing integral side rails for positively retaining the band.

Figures 10, 11, 12:
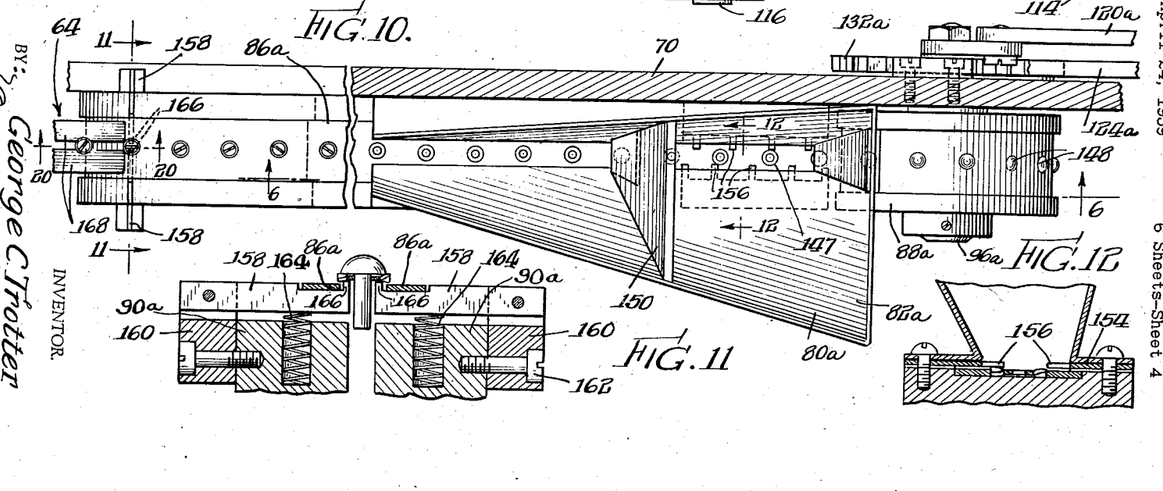
Figure 10 is a plan view of the washer hopper and feed assembly, overlying parts having been removed.
Figure 11 is a detail sectional view of the assembly ejector mechanism taken on the line 11—11 in Figure 10.
Figure 12 is a detail sectional view through the lower part of the feed hopper taken on the line 12—12 in Figure 10.

The washer feeding hopper comprises inclined side walls 80a, an upstanding rearward wall 82a, and an inclined baffle 150. Attention is directed to the fact that, in accordance with the present construction, the baffle 150 inclines outwardly as it progresses downwardly and has on its lower edge a stripper finger 152 which just clears the top surface of the band and, accordingly, any washers accommodated within the recesses formed by the apertures 147, while at the same time holding back and dislodging any washers not so confined. Referring particularly to Figures 10 and 12, it will be seen that between the bottom of the hopper and the band 86a are mounted opposite stripper plates 154 provided with lugs 156 projecting alternately on either side of the line of apertures 147 as they progress across the discharge opening of the hopper. As the loose washers strike these lugs 156 they are retarded, and since the point of retardation is adjacent one side only, there is a tendency to rotate or turn each washer and to free it from any adjacent washer with which its teeth might be interlocked. It will be apparent that this rotating action, furthermore, has a tendency to direct the washers centrally of the band into position where they are more likely to be received by the vacant apertures 147.

A flat spring member 104a and a baffle 108a complete the construction of the washer hopper.

It is an important purpose of the present invention to convey the washers in a predetermined linear path while they are received and supported within recesses of the endless belt 86a and at a point in said linear path to swing or move the screw blanks into association therewith. Subsequently and near the upper end of the path, the washers and, accordingly, the associated washers and screw blanks are ejected or lifted from their recesses and deposited upon the feed chute 64 which supplies the thread rolling mechanism, as hereinbefore described.

The ejecting means for the washers or assembled units, which is more clearly shown in Figures 10, 11 and 20, comprises a pair of levers 158 pivoted to blocks 160 secured to either side of the radius block 90a by fasteners 162. Compression springs 164 received within suitable recesses in the radius block press levers 158 outwardly, as clearly shown in Figure 11. Particular attention is directed to the fact that each of the ejector levers 158 is provided at its extremity with outwardly projecting lugs 166, which lugs are so located as to extend through the apertures 147. It should be noted that the upper surfaces of the lugs 166 are gradually curved in the direction of movement of the conveyor belt 86a so that they are depressed by the edge of the apertures 147 as they pass and are permitted to spring upwardly again under the influence of the springs 164 as the next succeeding aperture again registers with the lugs 166.

Resilient pick-up fingers 168 extending from the edge of the feed chute 64 press against the band closely adjacent the ejecting mechanism, whereby the fingers engage beneath the lock washer and retract the assembly from the conveyor band.

From the foregoing it will be seen that in operation the washers massed or dumped into the washer receiving hopper are successively arranged within recesses in the conveyor band and are carried thereby in a linear path to a point of discharge, where they are lifted from the recesses by an ejecting means and deposited upon a downwardly inclined chute. It should be noted that while being conveyed, the washers are supported upon the surface of the fixed plate 149, and more particular attention is called to the fact that the plate is slotted or bifurcated adjacent its upper end as at 170 for receiving the shank portion of the fastener, as will hereinafter more fully appear.

The assembly mechanism

The screw blanks, on reaching the foot or terminus of the chute 142, are caused to swing into association with washers carried by the washer feed mechanism through the agency of the assembly mechanism shown more in detail in Figures 6 and 13 to 19, inclusive. The assembling mechanism comprises a solenoid 172, the armature of which is secured to a frame 174 having a forwardly projecting arm 176 terminating in a downwardly extending flange or plate 178. A downwardly extending arm 180 of the frame 174 carries a horizontally extending pusher plate 182. As more clearly shown in Figures 18 and 19, the pusher plate 182 has an inclined forward edge for engaging behind the shank of a screw blank for forcing it in a forward direction, whereas the stop plate 178 is spaced forwardly of the pusher plate and is adapted to stop or retain momentarily the head of the blank. In order to prevent a blank from moving upwardly with respect to the frame, the supporting arm 176 is counterbored to receive a pressure pin or plunger 184, Figure 13, the top of which is engaged and held downwardly by means of a leaf spring 186. The frame 174 carries an upwardly projecting arm 188, which rigidly mounts a shaft 190 slidable in upwardly extending portions of a bracket 192, which is in turn rigidly mounted on the solenoid housing. Jam-nuts 191 on the rearward extremity of the shaft 190 limit the forward movement of the frame 174, while spring 194 resiliently returns the frame to its limit of movement when the solenoid is deenergized. The entire solenoid assembly is mounted through the agency of a bracket 196 upon the side of the screw blank guide chute 142, so that the stop plate and pusher plates 178 and 182, respectively, are operable transversely of the extremity of the foregoing chute. In operation, the solenoid is actuated and released in timed relationship to the operation of the washer feed device to deposit the extremity of each screw shank directly into the adjacent washer by means of a slight rotational or swinging movement. Timed operation of the solenoid is effected by cam means to be hereinafter described.

Figures 13, 14, 15, 18, 19:
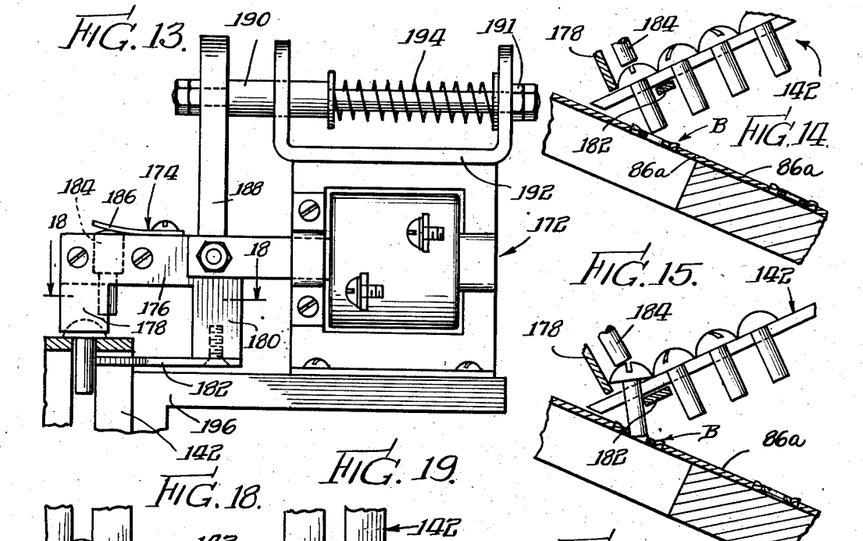
Figure 13 is an elevational view of the screw blank directing and assembly member.
Figures 14 to 17, inclusive, are elevational views showing in detail the association of the screw blanks and the washers at the point of intersection of the respective paths of feed, the operation being shown in several stages in order to illustrate the co-action of the screw blank control member for tilting the screw blank into association with the washer. These views are taken sectionally through the washer feeding web in the direction of feeding.
Figures 18 and 19 are detail plan views taken just above the terminus of the screw blank feeding chute, the control portions of the assembly member being shown in section.
Figure 16:
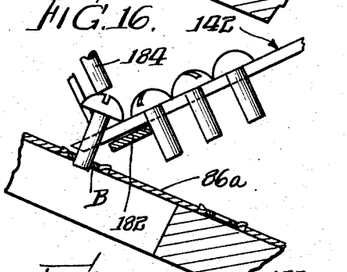
Figure 17:
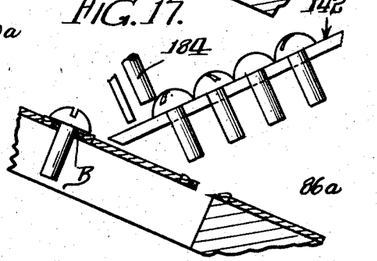

The operation of the solenoid in assembling the elements will be more clearly understood from a consideration of Figures 14 to 19. Figures 14 and 18 may be said to illustrate the initial or starting position in the operation of the device, with the solenoid energized and holding the stop plate 178 in front of the head of the lowermost screw blank. At this moment, a washer, indicated by the letter B, having progressed to a suitable position under the influence of forward conveying motion, the solenoid is de-energized, whereupon the spring 194 carries the assembling elements transversely across the chute toward the position shown in Figure 19. During this movement, it will be noted, see Figure 15, that engagement of the inclined edge of the pusher plate 182 against the rear of the adjacent screw shank, tending to move the screw shank to the left, is resisted by the stop plate 178 abutting the head portion of the blank so that the blank is in effect swung, rotated or pivoted through a clockwise arc. As a result, at the time the extremity of the blank has entered the hole in the lock washer and reached the position shown in Figure 15, the stop plate 178 has not yet released the blank, the pressure pin 184 is exerting the pressure against the head of the blank, and the pusher plate is exerting a resilient force against the shank. Consequently, the blank is wedged in this position and will remain so until the band advances. When the band proceeds to advance further, the screw blank straightens up and further enters the lock washer hole. Further movement, as shown in Figures 15, 16 and 17, frees the screw blank from its wedged position once it gradually settles down into the washer hole in normally assembled position. The present invention, however, contemplates also the insertion of a free extremity of the blank into the washer while the washer is being advanced under the influence of movement of the band 86a. The timing of this action is such with respect to the position of the washer B that the extremity of the blank swings directly into the central aperture of the washer. That is to say, the rotational movement of the blank is so coordinated with the movement of the washer conveyor that its extremity has only one relative movement with respect to the washer, to-wit, movement in a plane transversely thereof. As shown in Figures 16 and 17, the association of the elements having been initiated in the foregoing manner, the stop plate 178 continues aside to permit the assembly to pass and the screw element then falls completely into the washer, Figure 17. It will be understood that during this action the next succeeding screw blank is retained by the rearward edge of the pusher plate, as see Figures 16 and 19. During the foregoing action, the spring pressed pin or plunger 184 applies a resilient pressure to the screw blank, preventing it from rising upwardly.

From the foregoing it will be apparent that the instant assembly mechanism is located at the point of intersection of the paths of feed of the washer and the screw blank, and that the instant mechanism functions to direct or swing each successive screw blank at this point so that its extremity extends into the central aperture of the lock washer. The assembly means is then withdrawn, permitting the blank to settle into operative position.

The coordinating control mechanism

Figure 21:
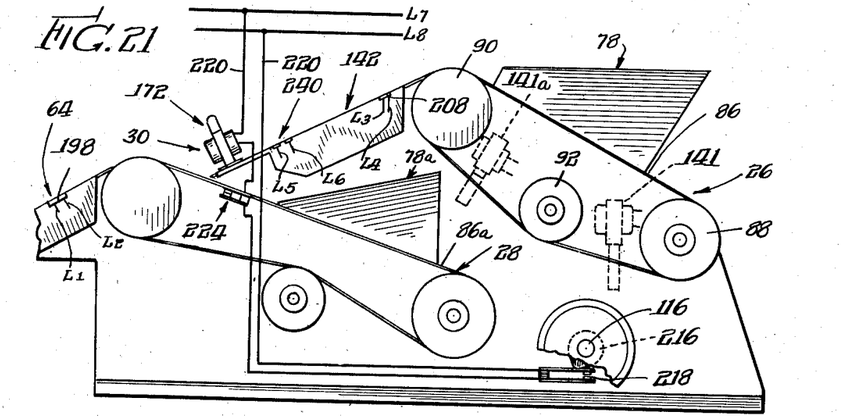
Figure 21 is a more or less diagrammatic view showing the various electrical control elements for coordinating the operation of the machine and illustrating diagrammatically the wiring circuit of the assembly unit.
Figure 22:
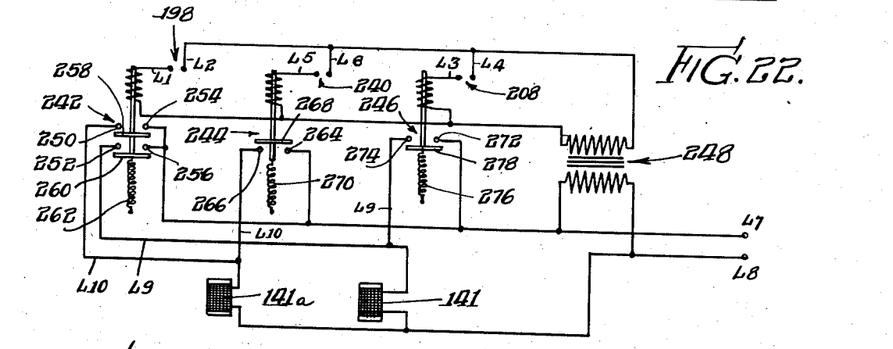
Figure 22 is a wiring diagram disclosing the circuit connections of the various control elements shown in Figure 21.

In accordance with the foregoing disclosure there has been described solenoid actuated means for selectively terminating progressive advancement of the washer and/or screw blank feeding mechanisms. In accordance with the present invention, these solenoid means are actuated or controlled in order to insure termination of operation of both of the feed means when an over-adequate supply is provided at the feed chute 64 supplying the thread rolling dies. This is effected, as shown in Figures 21 and 22, by a pair of contact plates 198 insulatingly supported in spaced relationship adjacent the top end of the chute 64. The contact points are provided with electric conduit leads L1 and L2, which are connected in a suitable electric circuit, to be hereinafter more fully described, for controlling the solenoids 141 and 141a to energize the solenoids when the chute 64 becomes loaded with assemblies up to the point 198.

The present invention also contemplates termination of the feeding of screw blanks when the chute 142 becomes excessively charged, and to this end there is provided adjacent the upper end of the chute 142 a pair of insulated and spaced contact members 208 forming a contact of identically the same character as above. It will be understood that the solenoid 141 will be energized to terminate operation of the screw blank feed when a circuit is closed across the contacts 208, the contacts being provided with current leads L3 and L4 for connection in the circuit to be hereinafter more fully described.

The present invention additionally contemplates the operation of an electrical control means to suspend operation of the washer conveyor mechanism when the supply of screw blanks has reached a predetermined minimum in the chute 142. The purpose of this construction is to assure the cessation of operation of the machine when for some reason the supply of screw blanks has become exhausted and continuance of its operation would cause unassembled washers to reach the thread rolling mechanism. This construction comprises a pair of spaced insulated plates 240 connected with current leads L5 and L6 and arranged adjacent the bottom portion of the screw blank feed chute 142, as shown in Figures 6 and 21. The contacts 240 function in combination with suitable electrical controls for permitting progressive advancement of the washer conveyor belt 86a only when an adequate supply of screw blanks is at hand.

The circuit diagram exemplifying the electrical control mechanism which operates the solenoids in response to the condition of the several feed chutes is shown in detail in Figure 22. In this figure, three individual solenoid relays are represented by the reference numerals 242, 244 and 246. It will be noted that the control coil of each of these relays is connected in circuit with one of the sets of paired contact plates which, for the present purposes, may be termed screw detector means. Thus the contact plates 198 on the chute 64 are in series with the control coil of the relay 242, contact plates 240 are in series with the control coil of the relay 244, and contact plates 208 are similarly connected with the relay 246. The relays receive actuating energy from a transformer 248 in circuit with the main power line represented by leads L7 and L8. A pair of spaced contacts 250 and 252 of the relay 242 are bridged to contact members 254 and 256 by means of bridging members 258 and 260 when the relay is energized by closing the circuit across the contact plates 198. The contacts are normally otherwise held open by means of a spring 262. As shown clearly in the figure, contacts 254 and 256 are directly connected in the current lead L7, and the opposed contacts 250 and 252 are connected to both the solenoids 141 and 141a through the agency of current leads L9 and L10, respectively. Both solenoids are therefore in series with the main power line through the contact points of the relay so that when the relay is energized to actuate the bridging members to closed position both relays become energized. Accordingly, the respective control levers 137 and 137a are moved into position to rotate the pawls 124 and 124a causing them to fail to interengage with the adjacent tooth of the respective ratchet wheels 132 and 132a. The movement thus imparted to the endless conveyor bands 86 and 86a is merely an alternate reciprocatory movement which in effect suspends progressive movement of the conveyor and, accordingly, causes cessation of feed of the respective elements.

The relay 244 is similarly provided with contacts 264 and 266 bridged by an electrical bridging member 268. It is to be particularly noted, however, that the present relay operates reversely from the previously described relay in that a spring 270 normally tends to close the circuit of the contacts 264 and 266 when the relay is de-energized. In contradistinction to the previous relay construction, the instant relay tends to break the circuit in which it is arranged when the relay is de-energized. Since the solenoid 141a is in series with the contact points 264 and 266 through the agency of connectors L10 and L7 and L8, the solenoid 141a is de-energized at all times when circuit to the contact plates is closed by the presence of a screw fastener in the lower part of the chute. In the absence of such a fastener, however, spring 270 draws the armature downwardly to close the circuit and energize the solenoid 141a to cease progression of the conveyor band 86a controlling the feed of the washers. The operation of the relay 246 to control the screw blank feed should be clearly understood from the foregoing description. Contact points 272 and 274 are in this construction arranged in circuit with solenoid 141 and are normally maintained in open circuit position by virtue of a spring 276 which draws a bridging member 278 downwardly away from the contact points. The presence of a fastener in position to close the circuit between the contact plates 208, accordingly, energizes the solenoid 141 and causes cessation of the screw blank feed drive.

In operation, accordingly, the foregoing control circuit functions in the following manner. The presence of a supply of screw blanks in the chute 142 maintains the circuit closed across the contact plates 240, holding relay 244 in upward position. The remaining relays are de-energized. When, however, an excess supply of screw blanks reaches the chute 142, circuit is closed between plates 208, actuating relay 246 to energize solenoid 141, whereupon the screw blank feed ceases until the excess supply has been assembled, whereupon circuit is broken and the feed again commences. Should the machine fail to operate to supply screw blanks, the termination of the supply at the point 240 results in de-energization of the solenoid 244, permitting the spring 270 to close the switch elements 264, 266 and 268 to stop the further feed of washers through actuation of solenoid 141a. In accordance with the same principle of operation, an excess supply of completed assemblies at point 198 in chute 64 actuates relay 242 to terminate feed of both the washer and screw blank supply feeds for retaining said feeds in quiescent position until such time as the excess supply is consumed by the thread rolling mechanism.

It will be understood that the present invention contemplates preferably the employment of solenoid and/or relay controls having a delayed action so that the temporary passage of fastening elements adjacent the contact plates will not serve to actuate the controls.

In Figure 21 there is shown the means for controlling the assembly mechanism, particularly for actuating the solenoid 172. This means comprises a cam 216 fixedly secured to shaft 116 and moving a make and break device 218 in timed relationship to the rotation of the driven shaft. Circuit to the assembly solenoid 172 is completed through electrical conduits 220 through the intermediary of a circuit breaking device 224, shown in Figure 21 and more in detail in Figure 8. This circuit breaking device is mounted upon the washer feed means just anterior to the point of assembly and comprises a block 226 secured to the side of the supporting plate 149 and carrying a pair of spaced, insulated contact fingers 228 below the plate. A spring 230 projects through an aperture 232 in the plate 149 just below the central portion of the washers. The spring 230, as shown in Figure 8, has its extremity secured to the block and is movable with the upper one of the spring fingers 228. Normally the spring contacts are closed, due to the fact that the spring finger 230 is held downwardly by impingement against the lower surface of the band or by contact with the lower surface of the lock washer body held within the recesses 147 when the band has come to rest. It should be noted that a confining plate 234 is rigidly mounted across the upper surface of the supporting plate 149 to retain the washer against the pressure applied thereto by the spring finger 230. It will be apparent from the foregoing however, that if no washer is in position, the spring finger 230 is permitted to move upwardly through the aperture in the band 86a a sufficient distance to permit the contact members to draw apart. This breaks the circuit to the solenoid 172, as disclosed in Figure 21, wherefore energization of the assembly control mechanism is terminated until a fresh quantity of washers is supplied to the conveyor 86a. It will be understood that the stopping of the assembly device will ultimately result in the cessation of the screw blank feeding mechanism when a maximum supply of blanks has been provided in the chute 142.

From the foregoing it will be apparent that the present invention provides an effective construction for continuously conveying washers and screw blanks from separate random masses thereof. Each of the feed or conveyor means indicated, respectively, by the reference numerals 26 and 28 supplies the respective elements in a linear path adjacent the point of intersection of said two paths. An assembly mechanism directs the end of the screw blank by swinging movement into the path of the washers to project its free extremity wedgingly into the central aperture of a washer. Further movement permits the blank to straighten up into a position normal to the plane of the washer and to settle into final operative association. The assembly now moving in the path of feed of the washers is ejected and transferred directly to the feed chute of a thread rolling mechanism. The present invention provides simple and effective means for progressing the washers in successive order and providing a supply of screw blanks in position adjacent the assembly points. A chute means provides a reservoir for an adequate supply of screw blanks, and control means terminates operation of the screw blank feed when the reservoir reaches a maximum, and at the same time stops operation of the washer feeding mechanism when the screw blank reservoir has decreased to a predetermined minimum. Should the washer feeding conveyor for some reason fail to supply a washer or washers in one or more of the apertures 147, the assembly mechanism becomes immediately de-energized and remains so until the apertures 147 recommence to supply washers. It will be obvious that this is of great importance, since it prevents the waste attendant the supply of unassembled screw blanks to the thread rolling machine which would otherwise occur.

Figure 23:
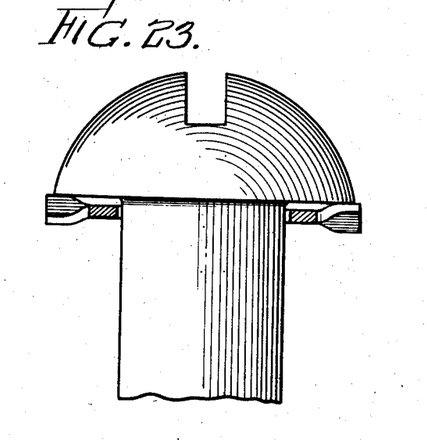
Figure 23 is an elevational view showing the head portion of a screw blank with a washer assembled in place, the washer being shown in transverse section.
Figure 24:
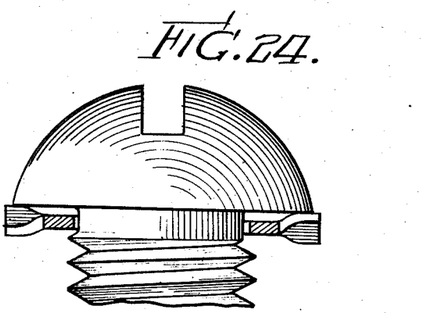
Figure 24 is a view the same as Figure 23 and illustrating the association of the parts after threads have been formed upon the shank of the fastener.

Figure 23 shows the assembly of a screw blank and lock washer as it is supplied to the chute 64 and before the screw threads are rolled thereon. In Figure 24 there is shown a view of the same assembly after the thread crests are projected outwardly by the thread rolling action to retain the lock washer in assembled position.

Changes may be made in the form, arrangement and construction of the several parts without departing from the spirit or scope of the invention or sacrificing any of its attendant advantages, and the right is hereby reserved to make all such changes as fairly fall within the scope of the following claims.

The invention is hereby claimed as follows:

1. The method of assembling a screw element with a washer element which comprises positively conveying a washer element at a predetermined rate along a predetermined rectilinear path, conveying the screw element along a predetermined path, and shifting said screw element angularly in timed relationship to the conveyance of said washer element to project the free extremity of the screw element into engagement with the aperture of the washer element while arranged in said path of conveyance.

2. The method of assembling a screw element with a washer element which comprises positively conveying a washer element at a predetermined rate along a predetermined rectilinear path, conveying a screw element along a second predetermined path to a station adjacent an intermediate point in said first named path of conveyance, projecting the screw element into said washer element to provide an assembled unit, and continuing positive conveyance of said assembled unit in said first named path to a point of discharge.

3. The method of assembling a screw element, having a clamping portion, with a washer element which comprises positively conveying the washer element along a predetermined path and at a predetermined rate, supplying the screw element to a station at a point intermediate of said path, and arcuately swinging said screw element into interengagement with the hole in the washer element in timed relationship with the arrival of said washer element at said station.

4. The method of assembling a screw element having a clamping portion, with a washer element which comprises positively conveying the washer element along a predetermined path and at a predetermined rate, supplying the screw element to a station at a point intermediate of said path, said screw element being inclined with respect to the plane of said washer element, and swinging the extremity of said screw element toward the washer element in timed relationship with the conveyance of said washer element for projecting the end of said screw element into engagement with the hole in the washer element.

5. The method of assembling a screw element with a washer element which comprises positively conveying the washer element along a predetermined path and at a predetermined rate, supplying the screw element to a station at a point intermediate of said path, said screw element being inclined with respect to the plane of said washer element, arcuately shifting the screw element in timed relationship with the positive conveyance of said washer element to bring the extremity of said screw element into wedging engagement with the aperture in said washer element, and continuing the conveying of said washer element to permit the screw element to fall into operative association with the washer element.

6. In a machine for assembling screw elements and washers, an endless conveyor member having means for receiving and positively engaging the washers in predetermined relationship and positively conveying said washers along a predetermined path and at a predetermined rate, means to arcuately move a screw element into wedging engagement with the hole in a washer at a point intermediate of said path, said conveyor being operative to continue positive advancement of the washer in said path to permit the screw element to associate itself with the hole in said washer.

7. In a machine for assembling screw elements and washer elements, the combination of a pair of containers for said elements, endless conveyors movable with relation to each container and comprising means for receiving said respective elements from said containers and positively conveying said elements in predetermined paths, and means for introducing screw elements into said washers to provide washer and screw assemblies, said washer conveyor being operable to positively move said washers from said point of assembly while containing said screw elements assembled therewith.

8. In a machine for assembling screw elements and washers, the combination of a container for washers, an endless conveyor movable with relation to the container and comprising means for receiving washers from said container and conveying said washers in a predetermined path, a container for screw elements, means for conveying said screw elements in a path intersecting said first named path at a point intermediate of said first named path, means for angularly shifting a screw element at said point for interengaging an aperture in a washer at said point, said endless conveyor means being adapted to convey said washer together with the screw element to a point of discharge.

9. In a machine for assembling screw elements and washers, the combination of a container for washers, an endless conveyor movable with relation to the container and comprising means for receiving washers from said container and positively conveying said washers in a predetermined path at a predetermined rate, a container for screw elements, means to feed screw elements along a path intersecting said first named path while maintaining said screw elements at an angle substantially normal to the path of movement thereof, and means for angularly shifting a screw element adjacent said point of intersection to bring the extremity thereof into engagement with a washer, said conveyor being operative to positively convey said washer away from said point of assembly to carry therewith an assembled screw element.

10. A machine for assembling screw elements and washers comprising the combination of a container for washers, a continuous conveyor band movable adjacent said container, said conveyor comprising means for receiving and positively positioning washers thereon, means for moving said conveyor to convey said washers in a predetermined path away from said container, and means intermediate of said path for introducing a screw element into the hole in a washer while positioned by said band.

11. In a machine for assembling screw elements and washer elements, a container for at least one kind of said elements, an endless conveyor movable adjacent said container and comprising means for receiving and positively engaging said one kind of elements on said conveyor, and actuating means for intermittently moving said conveyor first forwardly, to advance said elements and then backwardly to rearrange the elements within said container into position favorable for reception by said conveyor.

12. In a machine for assembling screw elements and washer elements, a container for at least one kind of said elements, an endless conveyor movable adjacent said container and comprising means for receiving and positively engaging said one kind of elements on said conveyor, actuating means for intermittently moving said conveyor first forwardly away from said container to advance said elements and then backwardly, to rearrange the elements within said container into position favorable for reception by said conveyor, and means for projecting said other kind of elements into assembled relationship at a point intermediate of said path of movement.

13. In a machine for assembling screw elements and washers, hopper means for receiving a mass of washers, a movable continuous band conveyor operable adjacent the discharge portion of the hopper, said conveyor comprising means for receiving individual washers and positively conveying said washers to a point remote from said hopper, means for projecting a screw element into the aperture in a washer while said washer is supported by said conveyor, said conveyor being operable to move the washer from the point of assembly.

14. In a machine for assembling screw elements and washers, hopper means for receiving a mass of washers, a movable conveyor operable adjacent the discharge portion of the hopper, said conveyor comprising means for receiving individual washers and positively supporting said washers in a substantially horizontal plane, means for actuating the conveyor to positively advance the washers in a predetermined path and at a predetermined rate, means intermediate of said path for arcuately moving the extremity of a screw element into wedging engagement with the hole in a washer, said conveyor actuating means being operable to positively move the washer and screw blank from said point to permit the screw element to operatively associate with the washer.

15. In a machine for assembling screw elements and washers, the combination of a container for screw elements, a container for washer elements, endless conveyor means operable adjacent the lower portion of said screw container and comprising means for receiving and positively engaging screw elements in said container, endless conveyor means operable adjacent the lower portion of said washer container and comprising means for receiving and positively engaging washer elements in said container, means for actuating said conveyors for positively conveying said elements in paths extending remotely from said containers, and means intermediate of the path of one of said conveyors for directing the elements from the other of the conveyors into assembled relationship with the elements carried by the said one conveyor while so conveyed.

16. In a machine for assembling screw elements and washers, the combination of a container for screw elements, a container for washer elements, endless conveyor means operable adjacent the lower portion of said screw container and comprising means for receiving and positively engaging screw elements in said container, endless conveyor means operable adjacent the lower portion of said washer container and comprising means for receiving and positively engaging washer elements in said container, means for actuating said conveyors for conveying said elements in paths extending remotely from said containers, one of said conveyors being adapted to deliver said one kind of elements to a station intermediate of the said path of conveyance of said other conveyor, means at said station for successively angularly shifting the said one kind of elements into assembled engagement with said other kind of elements while so supported and conveyed, and means for ejecting the assembled elements at the end of said path of conveyance.

17. In a machine for assembling screw elements and washers, the combination of a container for screw elements, a container for washer elements, endless conveyor means operable adjacent the lower portion of said screw container and comprising means for receiving and positively engaging screw elements in said container, endless conveyor means operable adjacent the lower portion of said washer container and comprising means for receiving and positively engaging washer elements in said container, means for actuating said conveyors for conveying said elements in paths extending remotely from said containers, said screw conveyor being adapted to deliver screw elements to a station intermediate of the path of conveyance of said washer conveyor, means at said station for arcuately shifting the extremities of said screw elements into assembled engagement with the holes in the said washers carried by said washer conveyor to provide an assembly and means of ejecting the assembled elements at the end of said path of conveyance.

18. In a machine for assembling screw elements and washer elements, a container for said screw elements, a second container for said washer elements, an endless band conveyor means operable adjacent said washer element container and comprising means for receiving washers, means for actuating said conveyor positively to move said washers in a predetermined path of movement, electrically operated means intermediate of said path of movement for directing a screw element into assembled engagement with a washer, and means for suspending action of said electrically operated screw element directing means when said washer receiving means is unoccupied, said last named means comprising a resilient member extending toward said washer receiving means and being adapted to resiliently yield when said receiving means is unoccupied, whereby to positively interrupt an electrical circuit to said directing means.

19. A machine for assembling screw elements and washers comprising a container for washers, a container for screw elements, movable band conveyor means operable adjacent said washer container and comprising means for positively engaging washers in said container and conveying said washers in a predetermined path to a point of discharge, conveyor means operable adjacent said screw element container and comprising means for engaging screw elements in said container and positively conveying said screw elements to a remote position, guide means for feeding said screw elements from said remote position to a position intermediate of said first named path for assembly with said washers, and means for suspending advance of said screw element conveyor when the last named guide means is occupied by a predetermined maximum of screw elements.

20. A machine for assembling screw elements and washers comprising a container for washers, a container for screw elements, endless conveyor means operable adjacent said washer container and comprising means for engaging washers in said container and conveying said washers in a predetermined path to a point of discharge, conveyor means operable adjacent said screw element container and comprising means for engaging screw elements in said container and positively conveying said screw elements to a remote position, guide means for feeding said screw elements from said remote position to a position intermediate of said first named path for assembly with said washers, means for suspending advance of said screw element conveyor when the last named guide means is occupied by a predetermined maximum of screw elements, and means for suspending advance of said washer conveyor when a predetermined minimum of screw elements occupies said guide member.

21. A machine for assembling screw elements and washer elements comprising a hopper for at least one of said elements, endless conveyor means operable adjacent the discharge portion of said hopper and comprising means for positively receiving said elements in succession thereon, drive means for moving said conveyor forwardly to a position remote from said hopper, said drive means being operable to alternately reverse the movement of said conveyor to rearrange the elements within the hopper, and resilient means associated with said hopper and overlying a portion of the conveyor adjacent the rearward wall of the hopper and yieldable to permit movement in a reverse direction under the influence of elements received by said conveyor.

22. The method of assembling screw and washer elements which comprises conveying the screw and washer elements along intersecting non-perpendicular paths, angularly swinging said screw element into proper relation to the washer element and through the aperture of the washer element as the washer element moves along its path of conveyance whereby to telescope the elements.

23. In a machine for assembling screws and washers, individual conveying means for feeding screws and washers along intersecting non-perpendicular paths and means adjacent the intersection of said paths and operable in timed relation to the washer conveying means for arcuately swinging the shank of a screw into the aperture in a washer as the washer is carried along its path of conveyance, one of the conveying means being movable beyond the intersection to feed the screw and washer in assembled relation.

24. In a machine for assembling screws and washers, individual conveying means for feeding screws and washers along intersecting non-perpendicular paths, and means adjacent the intersection of said paths for arcuately swinging each screw element transverse to its axis and in the direction of movement of the washer to telescope screw and washer elements as the washer is moving along its path of conveyance.

25. In a machine for assembling screws and washers comprising a hopper for washers, a moving conveyor member receiving washers directly from said hopper and having washer receiving recesses therein for the positive conveyance of the washers in successive relation, means for moving said conveyor member to carry the washer along a predetermined path, screw receiving means, means for feeding screws from said receiving means in succession to a point intermediate of said path with the screw in a plane through the center of the washer transverse to the body of the washer and with the shank of the screw at an acute angle to the body plane of the washer and means operable in properly timed relation to the conveyor member for swinging a screw along the path of movement of the washer member to telescope the screw into the washer for the conveyance of the assembled elements by the washer conveyor member.

26. In a machine for assembling screws and washers, individual conveying means for feeding screws and washers along intersecting non-perpendicular paths, means for intermittently operating the washer conveying means, and mechanism adjacent the intersection and including head and shank engaging means for swinging each screw element about its head as a fulcrum to wedge the screw element in the hole in the washer when the washer conveying means is at rest, and means for thereafter pressing the screw into the washer as the washer conveyor moves to carry the assembled elements from the point of assembly.

27. Screw feeding means comprising a hopper receiving a random mass of screws, said hopper having an opening therein through which screws gravitate out of the mass, a movable conveyor passing beneath said opening and slotted to receive the shanks of the screws with their heads resting on the conveyor, means for alternately moving said conveyor forwardly to advance the received screws and backwardly a lesser distance to facilitate the positioning of the screws in the slotted conveyor.

28. A screw feeding means comprising a hopper receiving a random mass of screws, said hopper having an opening permitting passage of the screws from the mass, a conveyor movable beneath said opening and slotted to receive the shanks of the screw elements with their heads resting on the conveyor, a resilient member overlying the conveyor to engage the head of the screw element on the conveyor and partially closing the hopper opening, and means alternately moving the conveyor forwardly to advance the screw elements and backwardly a lesser distance to facilitate the positioning of the screws in the slotted conveyor, said resilient member yielding upon the backward movement of the conveyor to agitate the screws at the hopper opening to facilitate their feeding therefrom and by engaging a screw to cooperate with the conveyor in positioning the screws thereon.

29. In a machine for assembling screw elements and washers, a movable perforated band conveyor member for positively conveying washers registering with the perforations in said member along a predetermined path in predetermined relationship and at a predetermined rate, and means for shifting a screw element into the hole in a washer and through the band conveyor member at a point intermediate of said path, said conveyor member being adapted to continue in said path to positively convey said screw and washer in assembled relationship to a discharge point.

30. A machine for assembling a screw element with a washer element which comprises a driven band, positively conveying washer elements associated with the band at a predetermined rate along a predetermined rectilinear path, means for conveying screw elements along a second predetermined path to a station adjacent said first named path of conveyance, means for projecting the screw elements at said station into said washer elements in succession while said washer elements are positioned in said path by said band to provide assembled units, and means for then removing the assembled units from the band.

GEO. C. TROTTER.

CERTIFICATE OF CORRECTION.

Patent No. 2,284,698. June 2, 1942.

GEORGE C. TROTTER.

It is hereby certified that error appears in the printed specification of the above numbered patent requiring correction as follows: Page 1, first column, line 22, for "convenienaly" read --conveniently--; page 3, second column, line 28, for "bear" read --bears--; page 9, first column, line 30, claim 14, for "blank" read --element--; line 31, same claim, for "element" read --blank--; and that the said Letters Patent should be read with this correction therein that the same may conform to the record of the case in the Patent Office.

Signed and sealed this 9th day of February, A. D. 1943.

(Seal)

Henry Van Arsdale,
Acting Commissioner of Patents.